United States Patent
Yang

(10) Patent No.: US 11,074,021 B2
(45) Date of Patent: Jul. 27, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Dawei Yang, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 422 days.

(21) Appl. No.: 15/913,177

(22) Filed: Mar. 6, 2018

(65) Prior Publication Data
US 2019/0050171 A1 Feb. 14, 2019

(30) Foreign Application Priority Data

Aug. 9, 2017 (JP) .............................. JP2017-154242

(51) Int. Cl.
*G06F 3/12* (2006.01)
*G06K 15/00* (2006.01)

(52) U.S. Cl.
CPC ............ *G06F 3/126* (2013.01); *G06F 3/1222* (2013.01); *G06F 3/1238* (2013.01); *G06F 3/1267* (2013.01); *G06F 3/1285* (2013.01); *G06F 3/1288* (2013.01)

(58) Field of Classification Search
None
See application file for complete search history.

(56) References Cited

U.S. PATENT DOCUMENTS

| 8,560,538 | B2 | 10/2013 | Shibata et al. |
| 2010/0073715 | A1* | 3/2010 | Lee ................... G06F 3/1205 358/1.15 |

FOREIGN PATENT DOCUMENTS

| JP | H11-129586 A | 5/1999 |
| JP | 2004-164653 A | 6/2004 |
| JP | 2006-72739 A | 3/2006 |
| JP | 2009-246619 A | 10/2009 |
| JP | 2013-196498 A | 9/2013 |
| JP | 2014-87962 A | 5/2014 |
| JP | 2016-062303 A | 4/2016 |

OTHER PUBLICATIONS

Apr. 20, 2021 Office Action issued in Japanese Patent Application No. 2017-154242.

* cited by examiner

*Primary Examiner* — Dov Popovici
(74) *Attorney, Agent, or Firm* — Oliff PLC

(57) ABSTRACT

An information processing apparatus includes an acquisition unit, a generating unit, an issuing unit, and an output unit. The acquisition unit acquires print process information including a print target file that is to be printed. The generating unit generates integrated print process information in accordance with a request for unifying multiple pieces of print process information. The integrated print process information is information in which the pieces of print process information are unified. The issuing unit issues identification information for identifying the integrated print process information which is generated. When a user specifies the identification information, the output unit outputs, to an image forming apparatus, the integrated print process information corresponding to the specified identification information.

20 Claims, 10 Drawing Sheets

FIG. 7

| ID | RESERVATION NUMBER | FILE NAME | PASSWORD | STORAGE LOCATION | DOUBLE-SIDED PRINTING | SHEET SIZE | COLOR MODE | REGISTRANT | EXPIRATION DATE | ... |
|----|---|---|---|---|---|---|---|---|---|---|
| 43 | A34T56XX | ···Document 1 | XXXX | /files/43/ | Yes | A4 | Color | User A | 2017/4/4 | ... |
| 44 | 92EXZ011 | ···Document 2 | XXXX | /files/44/ | Yes | A3 | Monochrome | User B | 2017/4/1 | ... |
| 45 | 39405321 | ···Document 3 | XXXX | /files/45/ | Yes | A3 | Set when printing | User C | 2017/4/7 | ... |

FIG. 10

```
...
<Files>
 <File>
  <FileId>1</FileId>
  <PrintId>A34T56XX</PrintId>
 </File>
 <File>
  <FileId>2</FileId>
  <PrintId>92EXZ011</PrintId>
 </File>
 <File>
  <FileId>3</FileId>
  <PrintId>39405321</PrintId>
 </File>
</Files>
...
```

FIG. 11

| ID | RESERVATION NUMBER | FILE NAME | PASSWORD | STORAGE LOCATION | DOUBLE-SIDED PRINTING | SHEET SIZE | COLOR MODE | REGISTRANT | EXPIRATION DATE | ... | ... |
|---|---|---|---|---|---|---|---|---|---|---|---|
| 46 | J356XXE1 | Print_list | XXXX | /list/46/ | Yes | A4 | Color | User A | 2017/4/1 | | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-154242 filed Aug. 9, 2017.

BACKGROUND

(i) Technical Field

The present invention relates to an information processing apparatus and a non-transitory computer readable medium.

(ii) Related Art

Systems providing print services over networks have been proposed.

In a system providing a print service, to associate a file, which is to be printed, with a user who is going to print the file, an identification number such as a reservation number is issued for each file. The user operates, for example, an image forming apparatus installed in a shop such as a convenience store, and specifies the reservation number so as to print the file that is to be printed.

SUMMARY

According to an aspect of the invention, there is provided an information processing apparatus including an acquisition unit, a generating unit, an issuing unit, and an output unit. The acquisition unit acquires print process information including a print target file that is to be printed. The generating unit generates integrated print process information in accordance with a request for unifying multiple pieces of print process information. The integrated print process information is information in which the pieces of print process information are unified. The issuing unit issues identification information for identifying the integrated print process information which is generated. When a user specifies the identification information, the output unit outputs, to an image forming apparatus, the integrated print process information corresponding to the specified identification information.

BRIEF DESCRIPTION OF THE DRAWINGS

Exemplary embodiments of the present invention will be described in detail based on the following figures, wherein:

FIG. 7 is a diagram illustrating exemplary data registered in a management table;

FIG. 10 is a diagram illustrating exemplary integrated print process information;

FIG. 11 is a diagram illustrating exemplary data registered in a management table;

DETAILED DESCRIPTION

First Exemplary Embodiment

Configuration

Figure 1:
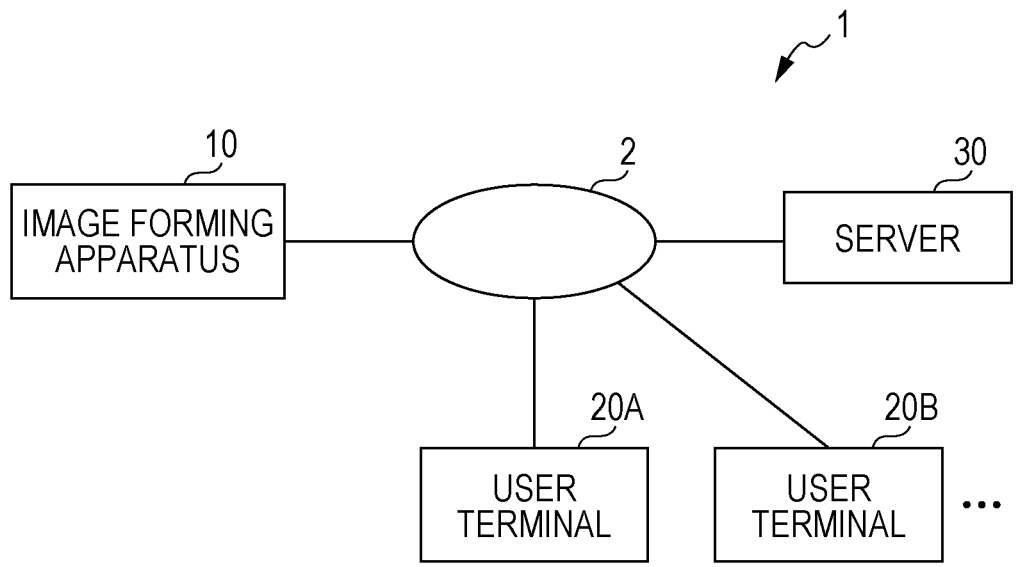
FIG. 1 is a diagram illustrating an exemplary configuration of a print system.

FIG. 1 is a block diagram illustrating the configuration of a print system 1 according to a first exemplary embodiment. The print system 1 includes an image forming apparatus 10, user terminals 20A, 20B, etc., and a server 30 (an exemplary information processing apparatus). The image forming apparatus 10 performs image processing, such as an image forming process of forming an image on a medium such as a recording sheet, and an image reading process of reading an image formed on a medium. The image forming apparatus 10 is installed, for example, in a shop such as a convenience store. The user terminals 20A, 20B, etc. are terminals such as personal computers. For convenience of description, when the user terminals 20A, 20B, etc. are not necessarily discriminated from each other, these are hereinafter called "user terminals 20". The image forming apparatus 10 and the user terminals 20 are connected to the server 30 through a communication line 2. The communication line 2 includes at least one of, for example, the Internet, a mobile communication network, a telephone line, and a local area network (LAN). The server 30 provides a service for, by using the image forming apparatus 10, printing a file (hereinafter referred to as a "print target file") that is a print target, such as a photograph or a document.

Figure 2:
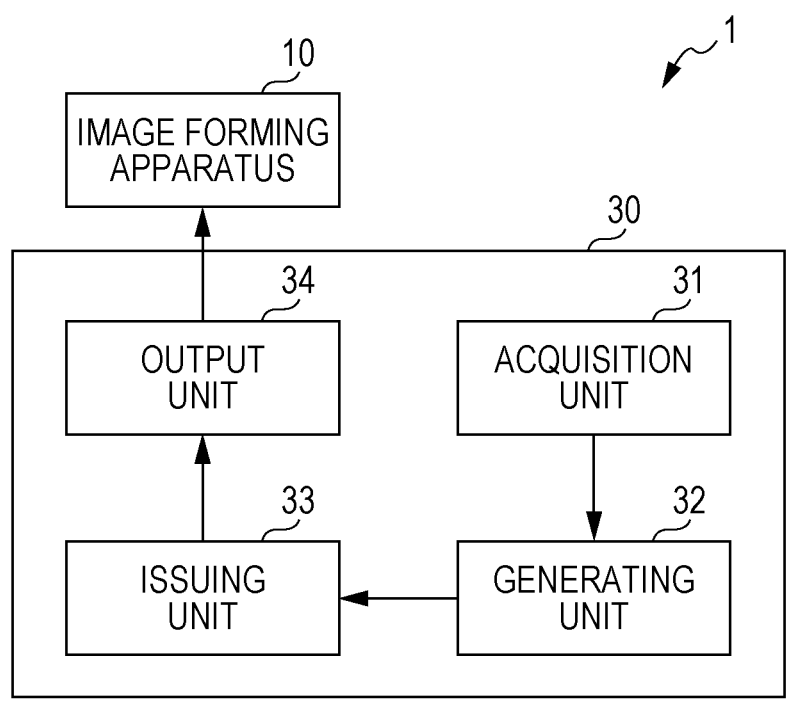
FIG. 2 is a diagram illustrating an exemplary functional configuration of the print system.

FIG. 2 is a block diagram illustrating an exemplary functional configuration of the print system 1. In FIG. 2, the server 30 includes an acquisition unit 31, a generating unit 32, an issuing unit 33, and an output unit 34. The acquisition unit 31 acquires print process information including a print target file. The print process information describing a print process indicates a series of processes including a page allocating process, a rasterizing process, an image forming process on a medium, and post-processing such as a bookbinding process, for example, stapling. The series of processes are performed on a print target file in which the information is described, for example, in a page description language (PDL).

In the first exemplary embodiment, the print process information includes binary data that is actual data for each page of a print target file, and also includes settings data indicating settings for a print process. For example, print process information of which the print target file is "Document1.pdf" includes binary data for each page of "Document1.pdf", and also includes settings data indicating print settings (for example, color/monochrome and Nup) referred to in printing the file.

The generating unit 32 generates integrated print process information in which multiple pieces of print process information are unified, according to a request that the multiple pieces of print process information are to be unified into a single piece of print process information. In the first exemplary embodiment, the expression "unify multiple pieces of print process information" indicates, for example, a process of generating a list of pieces of link information indicating the storage locations of multiple print target files, a process of writing data of the multiple print target files in a single file, or a process of generating a list of multiple pieces of print process information.

The issuing unit 33 issues identification information for identifying integrated print process information generated by the generating unit 32. When a user specifies the identification information, the output unit 34 outputs, to the image forming apparatus 10, integrated print process information corresponding to the specified identification information.

Figure 3:
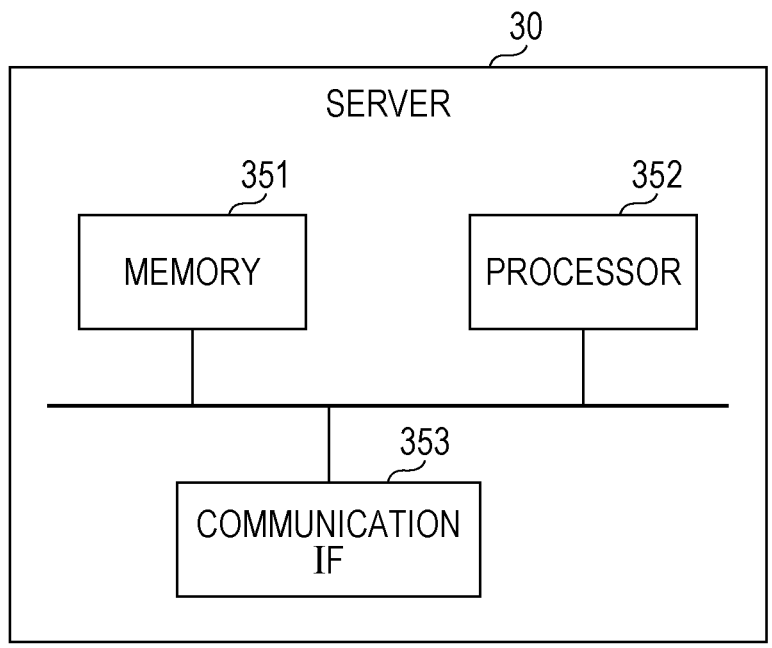
FIG. 3 is a diagram illustrating an exemplary hardware configuration of a server.

FIG. 3 is a block diagram illustrating an exemplary hardware configuration of the server 30. In FIG. 3, a memory 351 is used to store various data. A processor 352 performs data processing according to programs stored in the memory 351. A communication interface (IF) 353 performs data communication with external apparatuses over a network.

In this example, the processor 352 executes programs stored in the memory 351. Thus, the functions illustrated in FIG. 2 are implemented. The processor 352 executing the programs serves as examples of the acquisition unit 31, the generating unit 32, the issuing unit 33, and the output unit 34.

Figure 4:
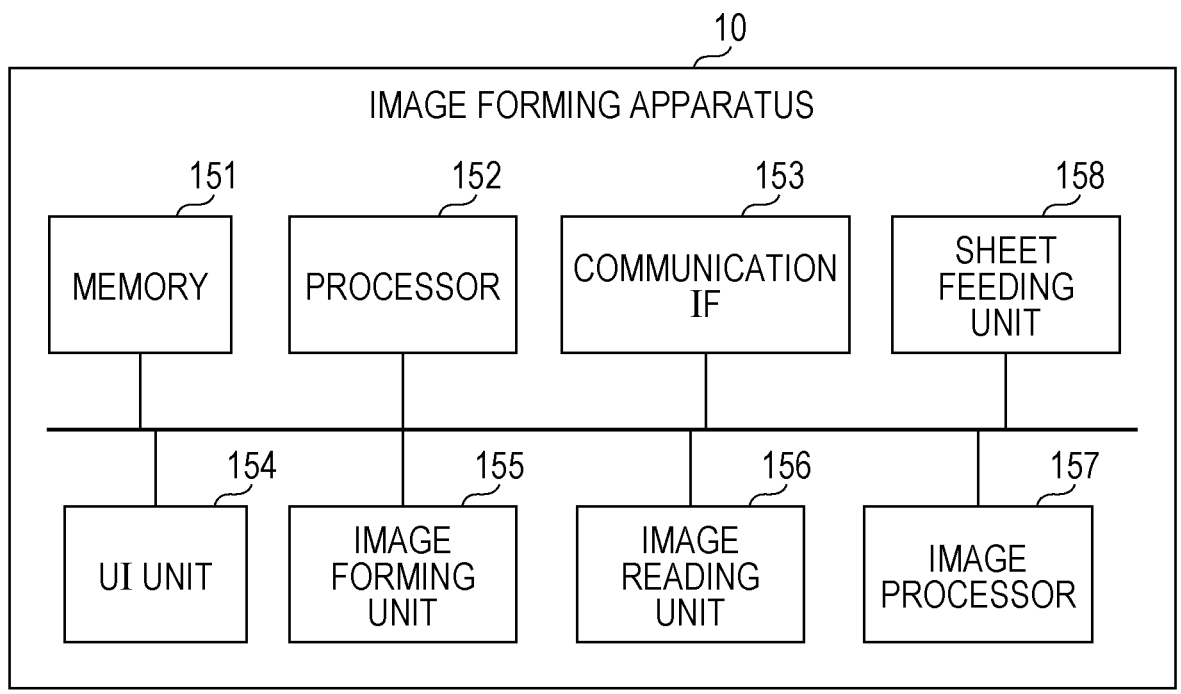
FIG. 4 is a diagram illustrating an exemplary hardware configuration of an image forming apparatus.

FIG. 4 is a diagram illustrating an exemplary hardware configuration of the image forming apparatus 10. In FIG. 4, a memory 151 is used to store various data. A processor 152 performs data processing according to programs stored in the memory 151. A communication IF 153 performs data communication with external apparatuses over a network. A user interface (UI) unit 154 includes, for example, a touch screen and keys. An image forming unit 155 forms an image on a medium such as a sheet by using an electrophotographic system. An image reading unit 156 optically reads an image on a document (medium). An image processor 157 includes, for example, a digital signal processor (DSP) or a graphics processing unit (GPU), and performs various types of image processing. A sheet feeding unit 158 feeds a medium such as a sheet to the image forming unit 155.

Figure 5:
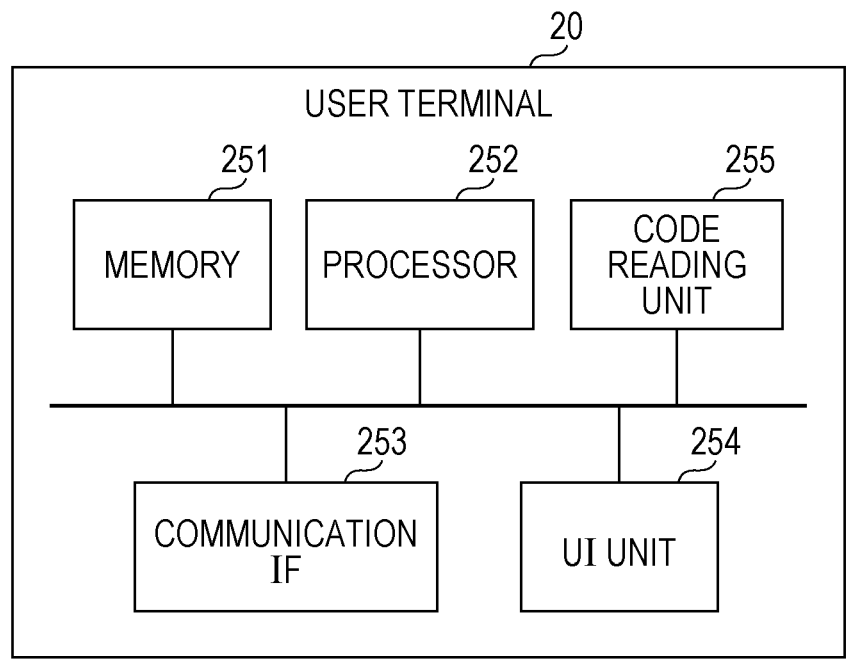
FIG. 5 is a diagram illustrating an exemplary hardware configuration of a user terminal.

FIG. 5 is a diagram illustrating an exemplary hardware configuration of a user terminal 20. In FIG. 5, a memory 251 is used to store various data. A processor 252 performs data processing according to programs stored in the memory 251. A communication IF 253 performs data communication with external apparatuses over a network.

Operations

Process of Registering a Print Target File

A user (hereinafter referred to as a "registrant") who registers a print target file uses a user terminal 20 to register the print target file in the server 30. The registrant operates the user terminal 20 to select the print target file and make print settings for the selected print target file. The print settings are settings for determining which parameters are used in printing when the print target file is printed. The print settings include, for example, a color/monochrome setting, an Nup setting, a double-sided/single-sided printing setting, a setting for an access range of a print target file, and a setting of a password necessary when a user causes the image forming apparatus to perform a print process. According to the operations, the processor 252 of the user terminal 20 selects a print target file, and generates settings data indicating print settings for the selected print target file.

The user inputs a password used in printing the print target file. The processor 252 generates, according to the operations, print process information including the print target file specified by the user, and transmits the generated print process information to the server 30. The transmitted print process information includes information, such as a print target file, print settings data indicating print settings, and a password.

Figure 6:
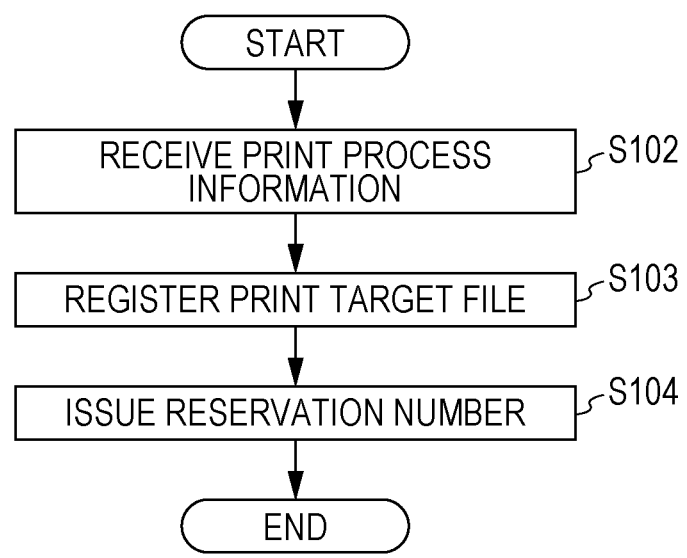
FIG. 6 is a flowchart of a process of registering print process information.

FIG. 6 is a flowchart of a registration process on print process information, which is performed by the server 30. In step S102, the processor 352 of the server 30 receives print process information from a user terminal 20 so as to obtain print process information including a print target file. In step S103, the processor 352 stores (registers), in a predetermined storage location, the print target file included in the received print process information. The stored print target file is a file of a predetermined data format for which, for example, the file name is "Document1.pdf", "Document2.doc", or "Document3.xdw". The print target file may be stored after conversion into a data format compatible with the image forming apparatus 10 which is an output destination.

In step S104, the processor 352 issues a reservation number (exemplary identification information) of the print process information specified by the user. The processor 352 transmits the issued reservation number to the user terminal 20 that is the transmission source of the print target file. The registrant checks the reservation number which is output from the user terminal 20, for example, on display.

The reservation number issued in step S104 is identification information used when the user gives a print instruction to the image forming apparatus 10. When the user gives a print instruction to the image forming apparatus 10, the user operates the UI unit 154 of the image forming apparatus 10 to specify the reservation number corresponding to the file that is to be printed. When the user specifies the reservation number, the image forming apparatus 10 transmits, to the server 30, a request to obtain print process information corresponding to the specified reservation number. The server 30 outputs, to the image forming apparatus 10, print process information corresponding to the reservation number specified by the user. On the basis of the received print process information, the image forming apparatus 10 prints an image described by the print target file.

In step S104, the processor 352 registers, in a predetermined management table, the issued reservation number, address information indicating the storage area of the print target file, and the like, which are associated with one another. The management table is stored, for example, in the memory 351.

FIG. 7 is a diagram illustrating exemplary data registered in the management table. In the table illustrated in FIG. 7, items, such as the "ID", the "reservation number", the "password", the "storage location", the "double-sided printing", the "sheet size", the "color mode", the "registrant", and the "expiration date", are stored in association with one another. Among these items, the "ID" item stores identification information with which print process information is uniquely identified. The "reservation number" item stores a reservation number issued for the print process information in step S104 in FIG. 6. The "file name" item stores the file name of the print target file. The "password" item stores a password which is set by the registrant. The "storage location" item stores information indicating the storage destination of the print target file. The "double-sided printing", the "sheet size", and the "color mode" store information that is exemplary information indicating print settings. The "double-sided printing" item stores information indicating double-sided printing or single-sided printing. The "sheet size" item stores information indicating the sheet size. The "color mode" item stores information indicating color printing or monochrome printing. The "registrant" item stores the identification information (user ID) for identifying the user who has registered the print process information. The "expiration date" item stores information indicating an expiration date such as a retention period of the print process information.

FIG. 7 illustrates an example in which the file paths of the print target files of three pieces of print process information registered by registrants are "/files/43/Document1.pdf", "/files/44/Document2.doc", and "/files/45/Document3.xdw".

When multiple pieces of print process information are to be registered in the server 30, the registrant repeatedly performs the above-described registration operation to register the multiple pieces of print process information. Every time the server 30 receives a registration request from the user terminal 20, the server 30 performs the registration process illustrated in FIG. 6, so as to register the print process information.

Print Integration Process

In the first exemplary embodiment, in response to a user request, multiple print target files are integrated (unified). A user (hereinafter referred to as an "integrator") who integrates multiple print target files obtains the reservation numbers of print target files that are to be integrated, and inputs the obtained reservation numbers in the user terminal 20. The integrator and the registrant may be a common user. The user terminal 20 transmits, to the server 30, a request which includes the received reservation numbers and which indicates that the multiple print target files are to be integrated into a single unit.

When the server 30 receives the request, the server 30 performs a process of integrating multiple print target files (hereinafter referred to as a "print integration process") according to the received request, and generates integrated print process information in which the multiple pieces of print process information are unified (which will be described in detail by using FIGS. 8 and 9).

Figure 8:
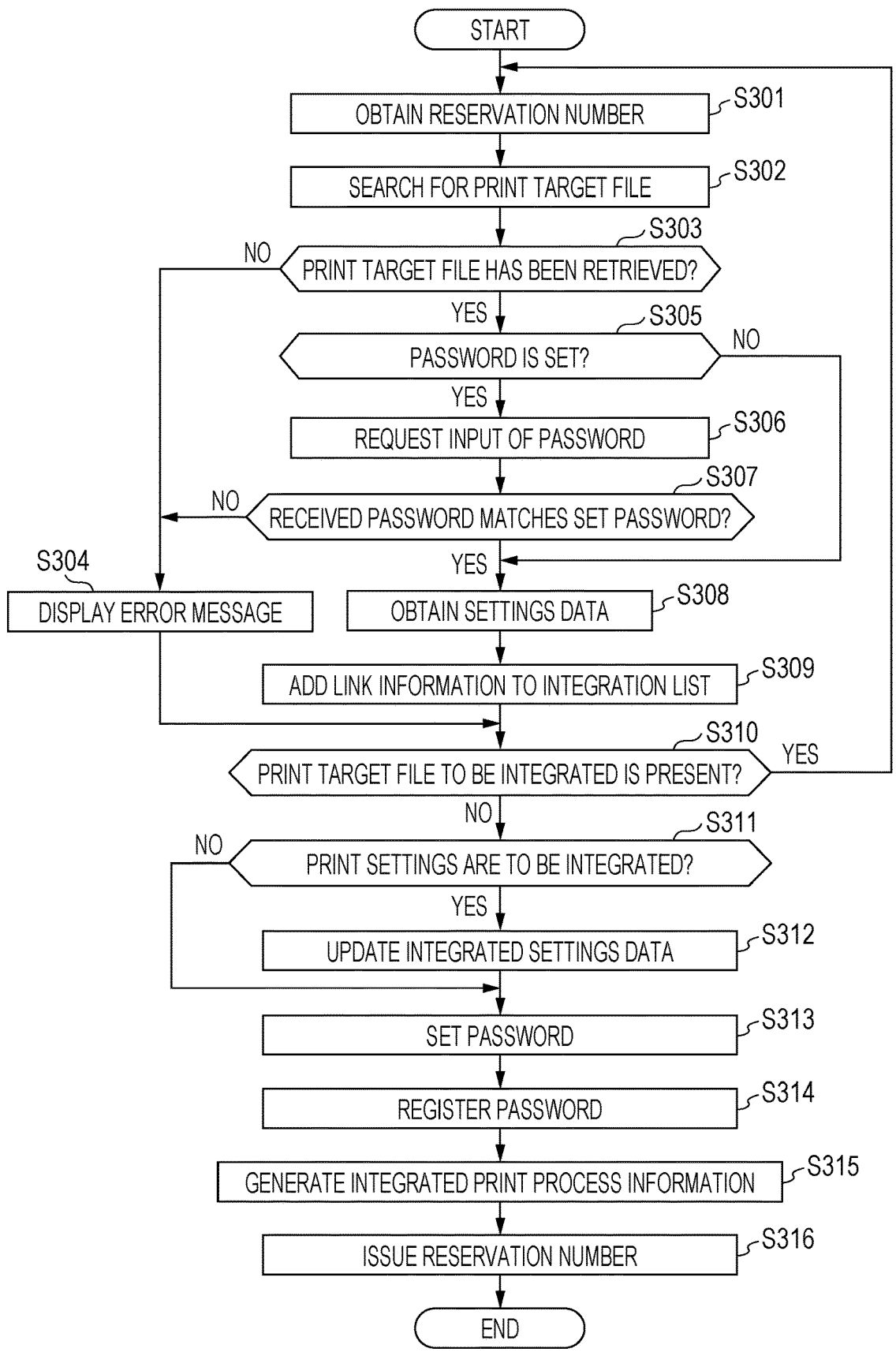
FIG. 8 is a flowchart of a print integration process.

FIG. 8 is a flowchart of the print integration process performed by the server 30. Reception of a request, including reservation numbers, from a user terminal 20 triggers start of the process illustrated in FIG. 8. In step S301, the processor 352 obtains a reservation number included in the received request. In step S302, the processor 352 searches the management table for the print target file corresponding to the obtained reservation number. In step S303, the processor 352 determines whether or not the print target file has been retrieved from the management table. If it is determined that the print target file has been retrieved (YES in step S303), the processor 352 causes the process to proceed to step S305. In contrast, if it is determined that the print target file has not been retrieved (NO in step S303), the processor 352 causes the process to proceed to step S304.

In step S304, the processor 352 displays an error message, and causes the process to proceed to step S310.

In step S305, the processor 352 checks if a password is set for the retrieved print target file (hereinafter referred to as a "target file"). If it is determined that a password is set (YES in step S305), the processor 352 causes the process to proceed to step S306. In contrast, if it is determined that a password is not set (NO in step S305), the processor 352 causes the process to proceed to step S308.

In step S306, the processor 352 transmits, to the user terminal 20, a request for input of a password. The user terminal 20 displays, on a UI unit 254, a screen for inputting a password. The integrator inputs a password according to the displayed input screen. The user terminal 20 transmits, to the server 30, the received password as a response to the received request.

Upon reception of the password from the user terminal 20, the processor 352 determines whether or not the received password matches the set password in step S307. If it is determined that the received password matches the set password (YES in step S307), the processor 352 causes the process to proceed to step S308. In contrast, if it is determined that the received password does not match the set password (NO in step S307), the processor 352 causes the process to proceed to step S304.

In step S308, the processor 352 obtains settings data of the target file. In step S309, the processor 352 adds, to an integration list, link information indicating the storage location of the target file. The integration list is, for example, a list of pieces of link information indicating the storage locations of the multiple print target files.

In step S310, the processor 352 determines whether or not a different print target file to be integrated is present. This determination may be made, for example, in such a manner that the processor 352 transmits, to the user terminal 20, a request for asking if a different print target file to be integrated is present, and that the processor 352 checks a response transmitted from the user terminal 20 according to a user operation. In step S310, if it is determined that a different print target file is present (YES in step S310), the processor 352 causes the process to return to step S301, and the processor 352 performs processes in step S301 and its subsequent steps on the different file that is to be integrated. In contrast, if it is determined that no different files are present (NO in step S310), the processor 352 causes the process to proceed to step S311.

In step S311, the processor 352 asks the integrator if the print settings are to be integrated. In the first exemplary embodiment, the processor 352 transmits, to the user terminal 20, a request to ask if the print settings are to be integrated, and receives a response transmitted from the user terminal 20 according to a user operation. Thus, the processor 352 checks if integration of the print settings is to be performed. If it is determined that the print settings are to be integrated (YES in step S311), the processor 352 causes the process to proceed to step S312. In contrast, if it is determined that the print settings are not to be integrated (NO in step S311), the processor 352 skips step S312 and causes the process to proceed to step S313.

In step S312, the processor 352 updates integrated settings data (hereinafter referred to as "integrated settings") indicating common print settings for the integrated print target files. Specifically, the processor 352 updates the integrated settings data in accordance with data transmitted from the user terminal 20 according to user operations. The processor 352 may generate integrated settings data by unifying the print settings for the multiple print target files. For example, when the sheet-size setting values for the multiple print target files are different from each other, the largest size among the sheet sizes may be selected as an integrated setting. In addition, for example, when the color/monochrome setting values for the multiple print target files are different from each other, the setting value indicating color setting may be selected as an integrated setting.

In step S313, the processor 352 sets a password for the integrated print process information. Specifically, the processor 352 transmits, to the user terminal 20, a request to prompt setting of a password, and receives a password transmitted from the user terminal 20 according to a user operation. In step S314, the processor 352 registers, in the management table, the password received in step S313. A password is not necessarily set for the integrated print process information.

In step S315, the processor 352 generates integrated print process information in which multiple pieces of print process information are unified.

Figure 9:
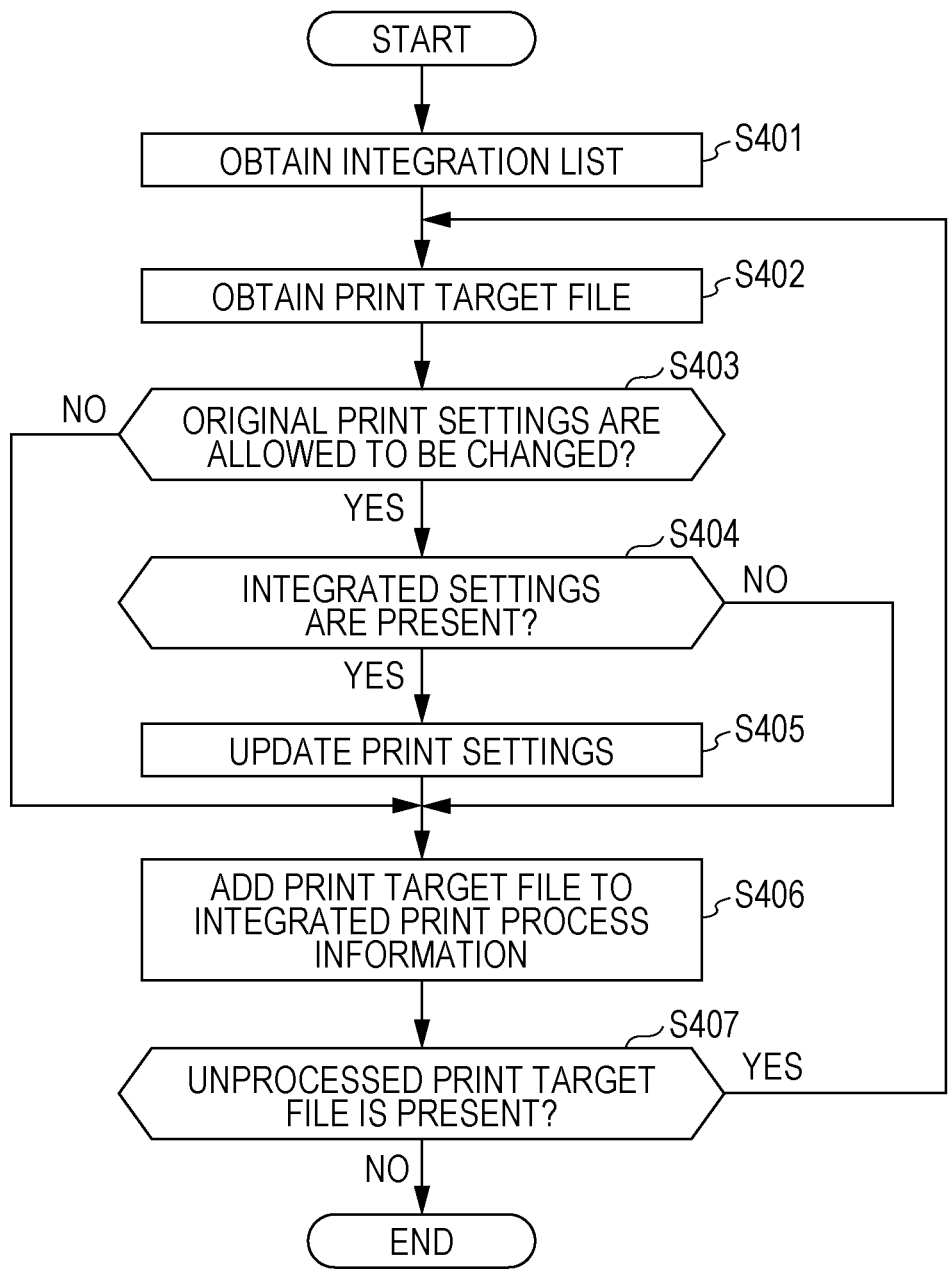
FIG. 9 is a flowchart of a process of generating integrated print process information.

FIG. 9 is a flowchart of a process of generating integrated print process information, which is performed by the server 30 (step S315 in FIG. 8). In step S401, the processor 352 obtains the integration list. The integration list is generated by repeatedly performing the processes from step S301 to step S310 in FIG. 8. In step S402, the processor 352 obtains one of the print target files from the integration list obtained in step S401.

In step S403, the processor 352 determines whether or not the original print settings which are set for the print target file (hereinafter referred to as a "target file") obtained in step S402 are allowed to be changed. This determination is made, for example, by referring to a flag which indicates whether or not the change is allowed and which is included in the print target file. If it is determined that the change is allowed (YES in step S403), the processor 352 causes the process to proceed to step S404. In contrast, if it is determined that the change is not allowed (NO in step S403), the processor 352 skips step S404 and step S405, and causes the process to proceed to step S406.

In step S404, the processor 352 determines whether or not the integrated settings are present (whether or not the integrated settings have been updated in step S312 in FIG. 8). If it is determined that the integrated settings are not present (NO in step S404), the processor 352 skips step S405, and causes the process to proceed to step S406. In contrast, if it is determined that the integrated settings are present (YES in step S404), the processor 352 causes the process to proceed to step S405.

In step S405, the processor 352 updates the print settings for the print target file obtained in step S402 in accordance with the integrated settings data. In step S406, the processor 352 adds the print target file to the integrated print process information so as to integrate the print process information. In the first exemplary embodiment, the processor 352 generates a definition file indicating a list of pieces of link information indicating the storage locations of print target files, as integrated print process information, so as to integrate print process information.

FIG. 10 is a diagram illustrating exemplary integrated print process information. In this example, a definition file indicating a list of pieces of link information indicating the storage locations of multiple print target files is generated.

Returning to FIG. 9, in step S407, the processor 352 checks if an unprocessed print target file is present in the integration list. If it is determined that an unprocessed print target file is present (YES in step S407), the processor 352 causes the process to proceed to step S402, and performs the processes from step S402 to step S406 on the next print target file. In contrast, if it is determined that an unprocessed print target file is not present (NO in step S407), the processor 352 ends the process.

As described above, multiple pieces of print process information are integrated so that integrated print process information is generated. For example, when three pieces of print process information for print target files of "Document1.pdf", "Document2.doc", and "Document3.xdw" are integrated, the integrated print process information which is generated includes a list of pieces of link information indicating the storage locations of the three print target files, "Document1.pdf", "Document2.doc", and "Document3.xdw", and also includes integrated settings data indicating print settings used commonly for the three files.

Returning to FIG. 8, in step S316, the processor 352 issues a reservation number corresponding to the integrated print process information, and registers the issued reservation number in the management table. The reservation number issued in step S316 is identification information for identifying the integrated print process information generated in step S315.

FIG. 11 is a diagram illustrating exemplary data registered in the management table in step S316. In this example, the "reservation number" item stores the reservation number issued in step S316. The "file name" item stores the file name of the list. The "password" item stores the password registered in step S314 in FIG. 8. The "storage location" item stores information indicating the storage location of the list. The "double-sided printing", "sheet size", and "color mode" items store information (integrated settings data) indicating the integrated settings updated in step S312 in FIG. 8. The "registrant" item stores the user ID for identifying the integrator. The "expiration date" item stores information indicating the expiration date of the integrated print process information.

FIG. 11 illustrates an exemplary case in which an integrator integrates three print target files and in which the file indicating the list is stored in "/list/46/".

Print Process

A user (hereinafter referred to as a "printer") who gives a print instruction operates the image forming apparatus 10 and specifies a reservation number in order to specify a file that is to be printed. The image forming apparatus 10 transmits the specified reservation number to the server 30.

Figure 12:
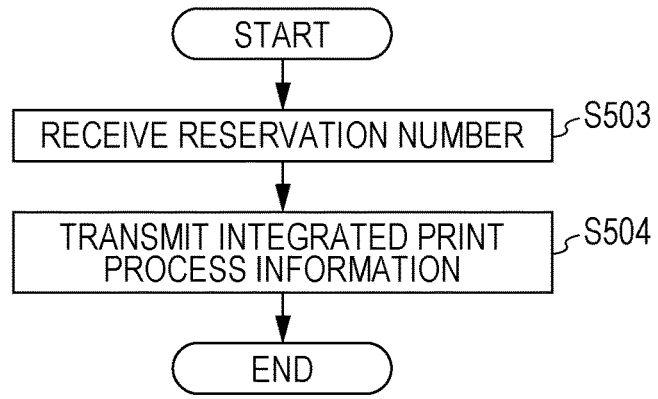
FIG. 12 is a flowchart of a print process.

FIG. 12 is a flowchart of a print process performed by the server 30. In step S503, the processor 352 receives the reservation number from the image forming apparatus 10. In step S504, the processor 352 transmits, to the image forming apparatus 10, integrated print process information that is associated with the reservation number received in step S503 (reservation number specified by the user). At that time, the processor 352 obtains print target files in accordance with the link information included in the integrated print process information corresponding to the reservation number specified by the user, and transmits, to the image forming apparatus 10, the integrated print process information including the obtained print target files.

Figure 13:
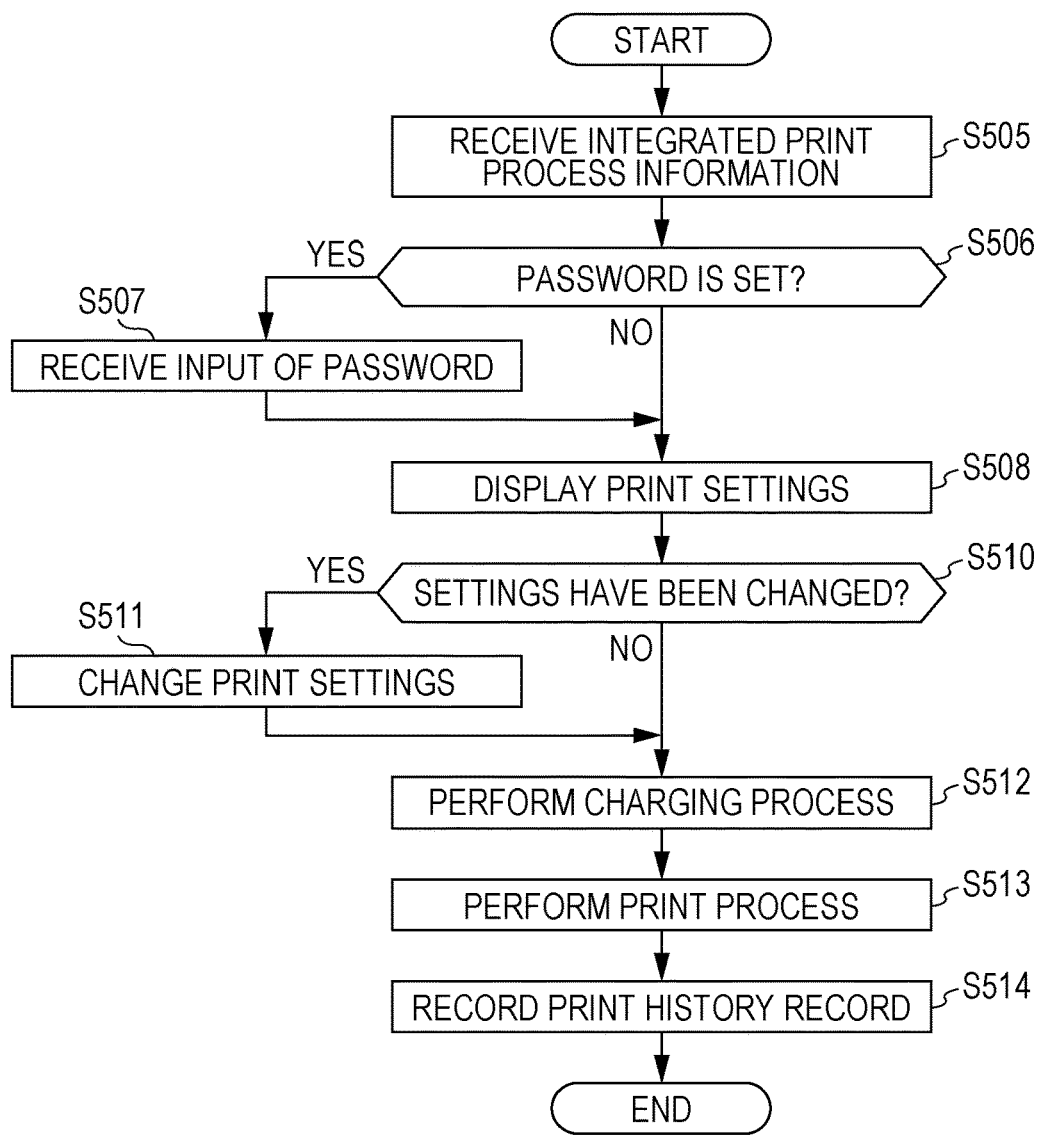
FIG. 13 is a flowchart of a print process.

FIG. 13 is a flowchart of a print process performed by the image forming apparatus 10. In step S505, the processor 152 receives the integrated print process information received from the server 30. In step S506, the processor 152 checks if a password is set for the integrated print process information which has been received. If it is determined that a password is set (YES in step S506), the processor 152 causes the process to proceed to step S507. In contrast, if it is determined that a password is not set (NO in step S506), the processor 152 skips step S507, and causes the process to proceed to step S508.

In step S507, the processor 152 causes the UI unit 154 to display a screen for prompting input of a password. The printer inputs a password on the screen displayed on the UI unit 154.

In step S508, the processor 152 causes the UI unit 154 to display the print settings for the print process information. The printer checks the print settings displayed on the UI unit 154. When a setting is to be changed, the printer changes the setting by using the UI unit 154.

In step S510, the processor 152 determines whether or not the printer has changed the settings. If it is determined that the settings have been changed (YES in step S510), the processor 152 causes the process to proceed to step S511. In contrast, if it is determined that the settings have not been changed (NO in step S510), the processor 152 skips step S511, and causes the process to proceed to step S512. When a setting is prohibited from being changed, step S510 and step S511 are skipped.

In step S511, the processor 152 changes the print settings in accordance with the operation performed by the printer. In step S512, the processor 152 charges the printer for printing. In step S513, the processor 152 controls the image forming unit 155 so that the image forming unit 155 performs printing. That is, printing is performed on the basis of the print process information or the integrated print process information including print data. In step S514, the processor 152 records, in a predetermined storage area, a print history record on printing the print process information. The execution order of the charging in step S512 and the printing in step S513 may be switched.

When multiple print target files are to be printed in the print system in which a reservation number is issued for a print target file, the printer may need to repeatedly input reservation numbers of the print target files multiple times, as many as the number of files, resulting in a troublesome operation. In addition, the time during which the printer performs operations may be prolonged. Thus, the time during which the printer occupies the image forming apparatus 10 may be prolonged, causing use of the image forming apparatus 10 by another user to be hindered. Each of the print target files has a different print settings set (such as a setting for color/monochrome and a setting for an access range) and a password. Therefore, every time a reservation number is input, the print settings set needs to be changed, and the password needs to be input.

To address this, in the first exemplary embodiment, multiple print target files are integrated into a single reservation number and single integrated print process information. Thus, even when a user wants to print multiple print target files, the user inputs only one reservation number, resulting in a reduction in the user's operation load produced when an instruction to print multiple print target files is given.

In the first exemplary embodiment, a reservation number issued by the server 30 as identification information for identifying integrated print process information has a common format to a reservation number issued for a single print target file. Therefore, a user may specify an integrated print process by using a common operation to a normal print process. When a print instruction is given, a user does not necessarily recognize whether the processing target is integrated print process information or normal print process information.

The format for integrated print process information received by the image forming apparatus 10 is common to normal print process information. Therefore, the image forming apparatus 10 does not necessarily recognize whether or not received print process information is integrated print process information. That is, the existing image forming apparatus 10 may be used as it is.

Second Exemplary Embodiment

A second exemplary embodiment of the present invention will be described. The second exemplary embodiment is different from the above-described first exemplary embodiment in that the process, which is performed by the server 30, of generating integrated print process information (step S315 in FIG. 8) is different, and in that the print process performed by the server 30 (FIG. 12) and the print process performed by the image forming apparatus 10 (FIG. 13) are different.

In the second exemplary embodiment, the processor 352 of the server 30 generates a list of multiple pieces of print process information as integrated print process information, issues a reservation number, and stores, in a predetermined storage area, the generated list in association with the reservation number.

Figure 14:
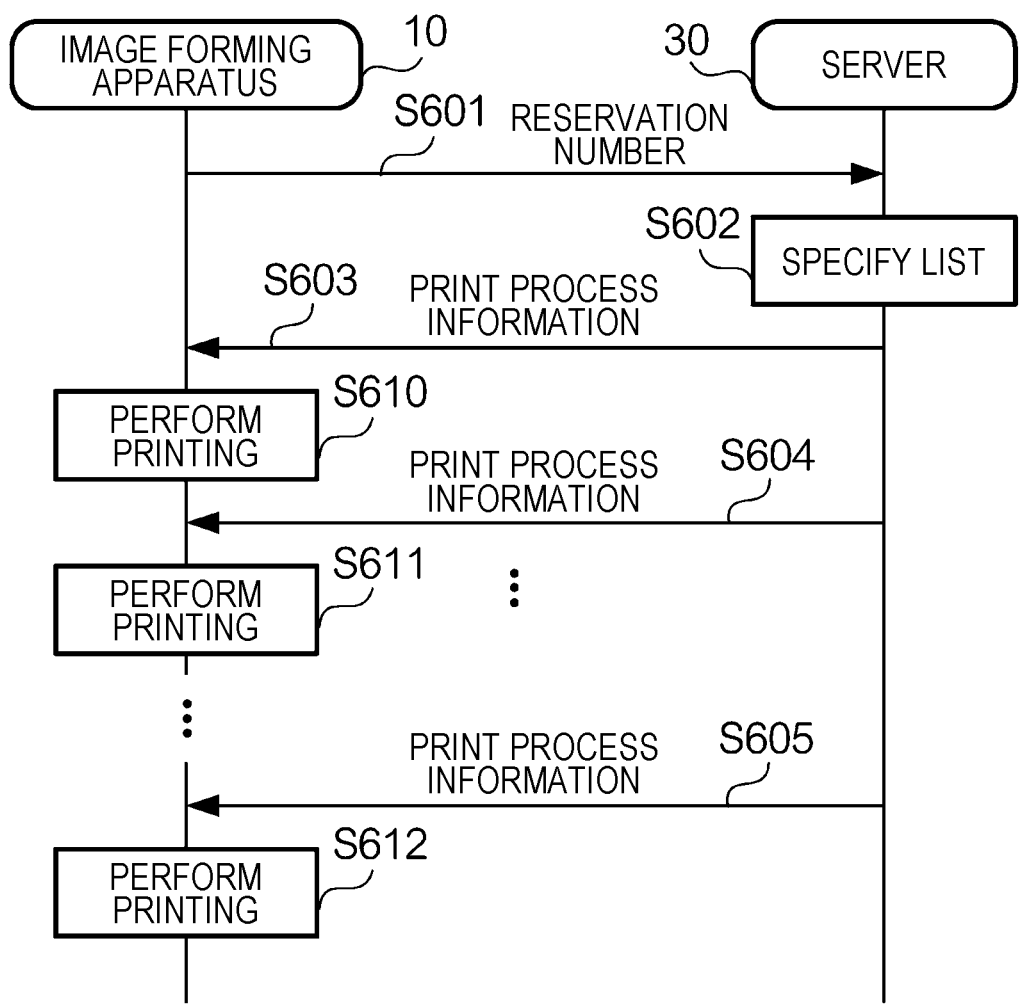
FIG. 14 is a sequence chart of a print process according to a second exemplary embodiment.

FIG. 14 is a sequence chart of a print process performed by the image forming apparatus 10 and the server 30. When a user specifies the reservation number of integrated print process information, the processor 152 of the image forming apparatus 10 transmits the specified reservation number to the server 30 in step S601. The server 30 receives the reservation number transmitted from the image forming apparatus 10.

In step S602, the processor 352 of the server 30 specifies the list (integrated print process information) associated with the reservation number specified by the user. In step S603 to step S605, the processor 352 sequentially transmits, to the image forming apparatus 10, pieces of print process information included in the list. Each of the multiple pieces of print process information transmitted through steps S603 to S605 includes a print target file and settings data.

In step S603, the processor 352 provides a notification by transmitting information which indicates that multiple pieces of print process information are to be transmitted and which is attached to the print process information. This information may indicate, for example, the number of pieces of print process information included in the list.

Every time the image forming apparatus 10 receives print process information from the server 30, the image forming apparatus 10 prints an image stored in the print target file, on the basis of the received print process information (S610 to S612). In addition, the image forming apparatus 10 determines whether or not print process information is to be successively transmitted, on the basis of the information received from the server 30. Until all of the pieces of print process information are received, the receiving process and the print output process are repeatedly performed.

According to the second exemplary embodiment, a single reservation number is assigned to multiple print target files integrated into a single piece of integrated print process information. Therefore, in transmission of an instruction to print multiple print target files, a user inputs only one reservation number. Thus, the user's operation load produced when the user gives an instruction to print multiple print target files is reduced.

Modified Exemplary Embodiments

The above-described exemplary embodiments are merely exemplary embodiments of the present invention, and may be modified as described below. In addition, the above-described exemplary embodiments and their modified exemplary embodiments described below may be combined with each other and carried out when necessary.

(1) The integrated print process information is not limited to that in the above-described exemplary embodiments. The integrated print process information may be, for example, obtained in such a manner that data in multiple print target files is written in a unit file. In this case, the integrated print process information includes binary data for each page of the multiple print target files, and also includes integrated settings data indicating print settings. In this case, the processor 352 of the server 30 combines, with each other, pieces of binary data of the print target files included in the multiple pieces of print process information, and generates integrated print process information including the combined binary data.

For example, when three pieces of print process information for print target files of "Document1.pdf", "Document2.doc", and "Document3.xdw", are present, the integrated print process information which is generated includes binary data for the three print target files of "Document1.pdf", "Document2.doc", and "Document3.xdw", and also includes integrated settings data indicating the print settings used commonly for the three files.

(2) In the above-described exemplary embodiments, programs executed by the processor 152 of the image forming apparatus 10, the processor 252 of a user terminal 20, or the processor 352 of the server 30 may be downloaded through a communication line such as the Internet. These programs may be provided by recording the programs in a computer-readable recording medium, such as a magnetic recording medium (a magnetic tape, a magnetic disk, or the like), an optical recording medium (an optical disk or the like), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor programed to
   acquire print process information including a print target file, the print target file is a file to be printed and is associated with an identifier issued by the processor;
   receive a request from a user for unifying a plurality of pieces of print process information, the request including a plurality of identifiers associated with a plurality of print target files included in the plurality of pieces of print process information that are to be unified;
   generate integrated print process information in accordance with the received request, the integrated print process information being information in which the plurality of pieces of print process information including the plurality of print target files specified in the request are unified;
   issue identification information for identifying the integrated print process information which is generated; and
   when the user specifies the identification information, output, to an image forming apparatus, the integrated print process information corresponding to the specified identification information.

2. The information processing apparatus according to claim 1,
   wherein the processor issues the identification information used when printing is performed on a basis of the print process information including the print target file, and
   wherein the processor outputs, to the image forming apparatus, the print process information or the integrated print process information, the print process information or the integrated print process information corresponding to the identification information specified by the user.

3. The information processing apparatus according to claim 1,
   wherein the print process information includes the print target file and settings data indicating a print setting for the print target file, and
   wherein the processor generates the integrated print process information including data and the settings data, the data being obtained by unifying the plurality of print target files of the plurality of pieces of print process information, the settings data indicating a common print setting for the plurality of print target files.

4. The information processing apparatus according to claim 2,
   wherein the print process information includes the print target file and settings data indicating a print setting for the print target file, and
   wherein the processor generates the integrated print process information including data and the settings data, the data being obtained by unifying the plurality of print target files of the plurality of pieces of print process information, the settings data indicating a common print setting for the plurality of print target files.

5. The information processing apparatus according to claim 3,
   wherein the processor combines, with each other, pieces of binary data of the print target files of the plurality of pieces of print process information, and generates the integrated print process information including the combined binary data.

6. The information processing apparatus according to claim 4,
   wherein the processor combines, with each other, pieces of binary data of the print target files of the plurality of pieces of print process information, and generates the integrated print process information including the combined binary data.

7. The information processing apparatus according to claim 3,
   wherein the processor generates a list of pieces of link information indicating storage destinations of the print target files of the plurality of pieces of print process information, and
   wherein, when the user specifies the identification information of the integrated print process information, the processor obtains the plurality of print target files in accordance with the link information of the integrated print process information corresponding to the specified identification information, and outputs, to the image forming apparatus, the integrated print process information including the obtained print target files.

8. The information processing apparatus according to claim 4,
   wherein the processor generates a list of pieces of link information indicating storage destinations of the print target files of the plurality of pieces of print process information, and wherein, when the user specifies the identification information of the integrated print process information, the processor obtains the plurality of print target files in accordance with the link information of the integrated print process information corresponding to the specified identification information, and outputs, to the image forming apparatus, the integrated print process information including the obtained print target files.

9. The information processing apparatus according to claim 1,
wherein the processor generates, as the intergrated print process information, a list of the plurality of pieces of print process information, and
wherein the processor sequentially outputs, to the image forming apparatus, the plurality of pieces of print process information included in the list.

10. The information processing apparatus according to claim 2,
wherein the processor generates, as the integrated print process information, a list of the plurality of pieces of print process information, and
wherein the processor sequentially outputs, to the image forming apparatus, the plurality of pieces of print process information included in the list.

11. The information processing apparatus according to claim 9,
wherein, when the user specifies the identification information of the integrated print process information, the processor notifies the image forming apparatus that the plurality of pieces of print process information are to be output.

12. The information processing apparatus according to claim 10,
wherein, when the user specifies the identification information of the integrated print process information, the processor notifies the image forming apparatus that the plurality of pieces of print process information are to be output.

13. A non-transitory computer readable medium storing a program causing a computer to execute a process comprising:
acquiring print process information including a print target file, the print target file is a file to be printed and is associated with an identifier issued by the computer;
receiving a request from a user for unifying a plurality of pieces of print process information, the request including a plurality of identifiers associated with a plurality of print target files included in the plurality of pieces of print process information that are to be unified;
generating integrated print process information in accordance with the received request, the integrated print process information being information in which the plurality of pieces of print process information including the plurality of print target files specified in the request are unified;
issuing identification information for identifying the integrated print process information which is generated; and
when the user specifies the identification information, outputting, to an image forming apparatus, the integrated print process information corresponding to the specified identification information.

14. An information processing apparatus comprising:
acquisition means that acquires print process information including a print target file, the print target file is a file to be printed and is associated with an identifier issued by the information processing apparatus;
receiving means that receives a request from a user for unifying a plurality of pieces of print process information, the request including a plurality of identifiers associated with a plurality of print target files included in the plurality of pieces of print process information that are to be unified;
generating means that generates integrated print process information in accordance with the received request, the integrated print process information being information in which the plurality of pieces of print process information including the plurality of print target files specified in the request are unified;
issuing means that issues identification information for identifying the integrated print process information which is generated; and
output means that, when the user specifies the identification information, outputs, to an image forming apparatus, the integrated print process information corresponding to the specified identification information.

15. The information processing apparatus according to claim 1, wherein
the print process information includes the print target file and settings data that indicates a print setting for the print target file,
the settings data for the print target file indicates at least one setting of double sided printing, sheet size, and color mode, and
the processor generates the integrated print process information including data and integrated settings data, the data being obtained by unifying the plurality of print target files of the plurality of pieces of print process information, the integrated settings data indicating a common print setting for the plurality of print target files based on the at least one setting of the print target file.

16. The non-transitory computer readable medium according to claim 13, wherein
the print process information includes the print target file and settings data that indicates a print setting for the print target file,
the settings data for the print target file indicates at least one setting of double sided printing, sheet size, and color mode, and
the process further comprises generating the integrated print process information including data and integrated settings data, the data being obtained by unifying the plurality of print target files of the plurality of pieces of print process information, the integrated settings data indicating a common print setting for the plurality of print target files based on the at least one setting of the print target file.

17. The information processing apparatus according to claim 14, wherein
the print process information includes the print target file and settings data that indicates a print setting for the print target file,
the settings data for the print target file indicates at least one setting of double sided printing, sheet size, and color mode, and
the generating means generates the integrated print process information including data and integrated settings data, the data being obtained by unifying the plurality of print target files of the plurality of pieces of print process information, the integrated settings data indicating a common print setting for the plurality of print target files based on the at least one setting of the print target file.

18. The information processing apparatus according to claim 15, wherein
the processor updates print settings data for another print target file included in the integrated print process information based on the integrated settings data to conform with the common print setting.

19. The non-transitory computer readable medium according to claim 16, wherein the process further comprises
updating print settings data for another print target file included in the integrated print process information based on the integrated settings data to conform with the common print setting.

20. The information processing apparatus according to claim 17, wherein
the generating means updates print settings data for another print target file included in the integrated print process information based on the integrated settings data to conform with the common print setting.

* * * * *